United States Patent [19]

Lohsl

[11] 4,129,743

[45] Dec. 12, 1978

[54] TERMINAL BOX FOR UNDERGROUND ELECTRICAL CONDUCTORS

[75] Inventor: Gerald A. Lohsl, Somerville, N.J.

[73] Assignee: Telephone Utility Terminal Co., Inc., Leesburg, Fla.

[21] Appl. No.: 683,859

[22] Filed: May 6, 1976

[51] Int. Cl.² .................. H02G 9/00; H02G 3/14; C23F 13/00
[52] U.S. Cl. .................. 174/38; 52/102; 174/16 R; 220/3.8; 220/18; 220/366; 220/371; 307/95
[58] Field of Search .............. 174/6, 16 R, 37, 38, 174/50, 66, 101; 361/356, 379, 383, 384; 307/95; 204/197; 220/4 B, 3.8, 3.9, 3.92, 3.94, 18, 80, 354, 355, 366, 371–374, DIG. 25; 47/33; 52/102; 312/100

[56] References Cited

U.S. PATENT DOCUMENTS

| 337,539 | 3/1886 | Warner | 220/355 |
|---|---|---|---|
| 2,158,868 | 5/1939 | Stacy | 361/383 |
| 2,645,612 | 7/1953 | Taylor | 204/197 |
| 3,164,668 | 1/1965 | Skubal | 174/38 X |
| 3,391,072 | 7/1968 | Pearson | 204/197 |
| 3,515,373 | 6/1970 | Abbe | 47/33 X |
| 3,650,072 | 3/1972 | Matvey | 52/102 |
| 3,714,369 | 1/1973 | Bunten | 174/38 |
| 3,740,452 | 6/1973 | Bunten | 174/38 |
| 3,872,234 | 3/1975 | Smith | 174/38 |

FOREIGN PATENT DOCUMENTS 1457720 9/1966 France ..................... 220/4 B

*Primary Examiner*—Laramie E. Askin
*Attorney, Agent, or Firm*—Beveridge, DeGrandi, Kline and Lunsford

[57] ABSTRACT

A terminal box used with underground electrical conductors is formed of opposed channels and a top cap with depending sidewalls. Air is permitted to flow to the interior of the housing via a filter beneath the cap, this filter being resistant to the passage of dust, water, blowing snow and insects. A weathertight seal is provided between the opposed channels by a resilient sealing strip and overlapping vertical marginal portions; and, upward access by animals and ground moisture to the interior of the housing is deterred by a continuous barrier sheet which extends transversely across the housing and is sealed thereto.

Corrosion damage to the housing is minimized by connecting it electrically to a buried plate formed of a metal which is anodic in the EMF series with respect to the housing metal. Grass fire and lawnmower-impact damage is reduced by surrounding the terminal box at ground level by a vegetation-inhibiting sheet.

Installation, servicing and modification are simplified, respectively, by providing a movable, detachable means for providing a conductor entry passage at the bottom of the housing interior; lining the channels with separate sheets of dielectric material; and, providing a replacement channel with enlarged side flanges to be substituted for one of the original channels to enlarge the size of the housing.

9 Claims, 6 Drawing Figures

TERMINAL BOX FOR UNDERGROUND ELECTRICAL CONDUCTORS

BACKGROUND AND SUMMARY OF THE INVENTION

This invention relates to a terminal box for housing electrical connections and components in underground cable transmission systems.

A principal use of the terminal box of this invention is in connection with telephone cables which have a large number of conductors which provide telephone or other communication services. When such cables are run underground, they are periodically brought above ground into terminal boxes of the type disclosed herein. In the terminal boxes, the cable jackets are removed, and individual conductors are spliced to outgoing cables or are terminated by being electrically connected to conductors which lead to the individual customers in the vicinity of the loop. The above-ground cable portion is usually an inverted U-shaped loop, but in some instances it will have only one leg, the individual conductor then being connected to various types of termination devices which are electrically connected to the customers being served.

The principal structural components of the terminal box of this invention are similar to those of existing terminal boxes, in the respect that a pair of mutually facing upright channels have overlapping vertical margin portions, with one of the channels carrying a cap which forms the top of the terminal box.

Terminal boxes are normally installed with their lowr ends buried several inches in the ground, their upper portions extending above the ground and exposed to the weather. These exposed conditions create a number of problems, the solutions to which are believed to be offered by the invention disclosed herein. One such problem is corrosion of the underground parts of a metallic terminal box. Another problem is that the interior of a terminal box may be invaded by insects, animals, dust and undesired amounts of moisture. Other problems are attributable to the fact that grass often grows very close to the terminal box. This leads to fire damage in the event of a grass fire, and impact damage when lawnmowers are continually brought into contact with the exterior surface of the terminal box.

The prior art also presents some problems with respect to the installation and maintenance of a terminal box and its enclosed electrical components. One inconvenience is caused by sheets of dielectric material which are wrapped around the components within the terminal box. These sheets are a source of annoyance to workers who for convenience have been known to remove these protective sheets, thus increasing the risk of an electrical short against the walls of the metallic terminal box. Another problem relates to vertical guides or passages in the lower portion of the terminal box for accommodating incoming and outgoing conductors. Conventionally, such passages are located at only one position on the housing, thus requiring the line to be fed to that particular position, and imposing substantial problems when it is necessary to replace part or all of the terminal box. Another practical problem arises when a terminal box is of insufficient size to accommodate the electrical components needed to serve the locality of the terminal box.

The object of the terminal box constructed according to the preferred embodiment of the invention is to avoid all of the foregoing problems in a simple, safe and effective assembly. The preferred embodiment disclosed herein utilizes a number of features, many of which may be used singly, but which collectively provide a terminal box which is convenient to install and modify, is resistant to corrosion of the buried portions thereof, is less likely to be damaged by lawnmowers, small vehicles or grass fires, may be serviced without tampering with the interiorly positioned dielectric sheet material, and excludes insects, animals, dust and undue moisture while still permitting ambient air to communicate with the interior of the housing.

An extremely important durability feature of the improved terminal box is the provision of a corrosion-avoidance system wherein a metallic terminal box is electrically connected to a buried piece of metal which, in the EMF series, is anodic to the metal of the terminal box.

An integrity-providing feature of the preferred embodiment of the invention is the pressure of a cap assembly provided with an insect-excluding seal located in the space between th cap and the housing member which is separable from the cap. This seal is air-permeable but it filters out undesired particulate contaminants such as dust, rain, snow and sand.

Another integrity-providing feature of the preferred embodiment of the invention is the use of a resilient strip to deter the entry of dust, rain or blowing snow into the splicing area of the housing. This strip is attached to one of the channels which forms the housing and is located where the front and rear channels of the terminal box overlie each other.

A third integrity-providing feature of the preferred embodiment of the invention results from a continuous barrier sheet located in the terminal box approximately at ground level to prevent upward entry into the splicing area of undue moisture, snakes and rodents. This barrier sheet may be cut by ordinary hand tools such as knives or scissors, and it is provided with support means for engaging the interior walls of the terminal box. A caulking or adhesive sealant assures the integrity of the barrier formed by this sheet.

A protective feature of the terminal box constructed according to the preferred embodiment of the invention, is the addition of a contiuous vegetation-inhibiting sheet surrounding the base of the terminal box at ground level to prevent grass and other vegetation from growing close to the terminal box. This reduces the likelihood that the terminal box will be struck by lawnmowers, it will increase the visibility of the terminal box at ground level for other small vehicles, and it will reduce the risk of damage to the terminal box contents in the event of grass fires.

A convenience feature of the invention is that the terminal box may be enlarged so as to accommodate electrical components which are larger in size or number. The terminal box is volumetrically expansible by replacing the removable channel members with channels which have deeper side flanges and thus provide a greater depth. This feature will provide for a substantial savings in maintenance and construction costs.

Another convenience feature according to the preferred embodiment of the invention is the attachment of a piece of dielectric material to the removable cover of the terminal box, and the attachment of a second piece of dielectric material to the stationary part of the terminal box, with the sheets overlapping in the area where the removable and stationary parts of the terminal box are interconnected. This arrangement prevents the establishment of undesired electrical contact between the grounded terminal box and its contents.

Still another convenience-motivated feature of the preferred embodiment of the invention is the provision in the lower section of the terminal box of a conductor guide passage through which conductors enter the lower end of the terminal box, the improvement of this feature being that the passageforming element is removably attached at one corner of the housing and is capable of being removably attached to any of the other corners of the housing to meet the exigencies of the particular terminal box installation.

DESCRIPTION OF A PREFERRED EMBODIMENT

In the exploded view of FIG. 1, it will be seen that the terminal box of the invention is formed of a housing having a rear channel 2 which confronts and meets with a front channel 4, the latter being formed of an aboveground removable cover 6 which provides access to the interior of the housing and a lower buried portion 8, approximately one-half of which lies below ground level in a normal installation.

Figure 1:
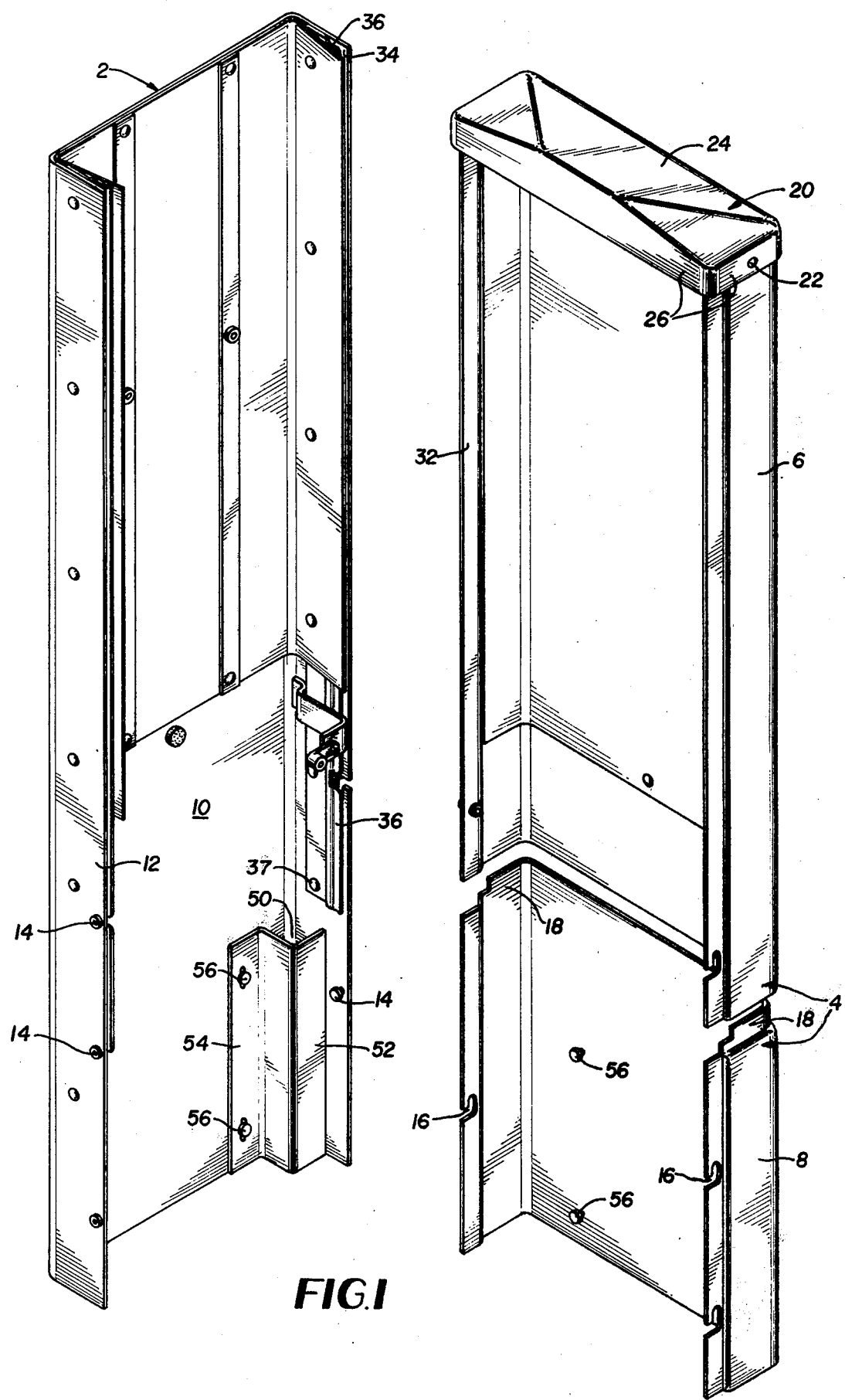
FIG. 1 is an exploded view of a preferred terminal box which embodies the many features of this invention.

The rear channel 2 has a rear panel 10 and forwardly-extending side flanges 12, the vertical marginal portions of which are provided with headed rivets 14, many of which are concealed behind a dielectric sheet in FIG. 1. The rivets 14 cooperate with the L-slots 16 located in the vertical marginal portions of the front channel elements 8 and 6 to connect together the front and rear channels.

To afford some degree of weather protection at the juncture between the front channel elements 8 and 6, the upper end of the lower front channel 8 is provided with a recessed vertical flange 18 which overlaps the interior bottom portion of the upper front channel 6.

Figure 2:
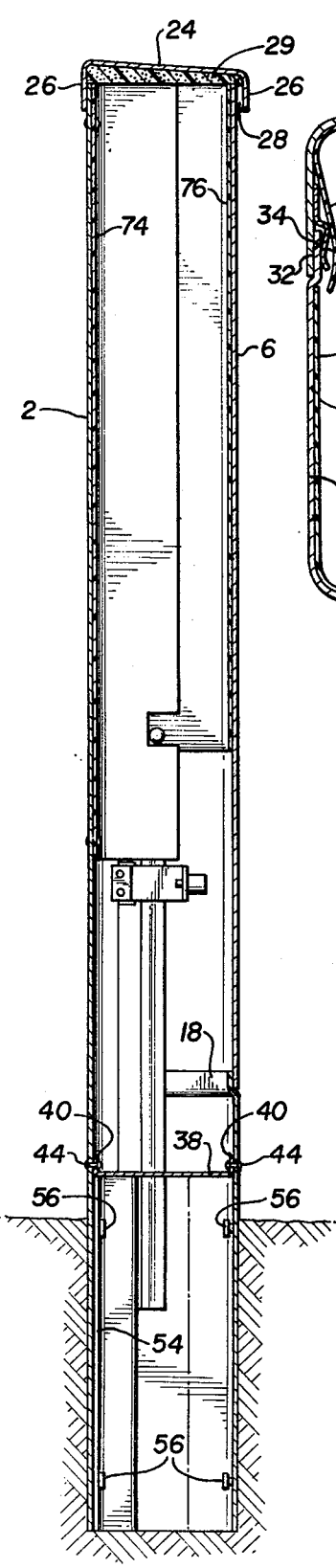
FIG. 2 is a vertical sectional view of the terminal box of FIG. 2 as assembled and installed.

The upper end of the housing is formed by a cap 20 which is riveted at 22 and elsewhere to the upper end of the upper front channel 6. The cap 20 has a top wall 24 and depending peripheral sidewalls 26. The sidewalls 26 are positioned so they will surround the upper portions of the rear channel 2 and front channel 4 when these elements are fit together as shown in FIG. 2. One of the peripheral sidewalls 26 is disposed to provide an air passage which leads upwardly into the housing as shown at 28 in FIG. 2. This permits the interior of the housing to "breathe" to avoid undue accumulation of moisture therewithin. Such passages in prior housings have created problems, as they enable dust, blown snow, wasps and other stinging insects to enter the housing, creating contamination problems, corrosion problems or safety problems to personnel who service the equipment within the terminal box. These problems are avoided by placing a filter 29 across the upper end of the air passage 28, enabling air to pass but deterring the passage of dust, water and stinging insects. The preferred material for the filter is reticulated plastic foam such as that used in furnace air filters or for media in drum-type humidifier units.

Figure 3:
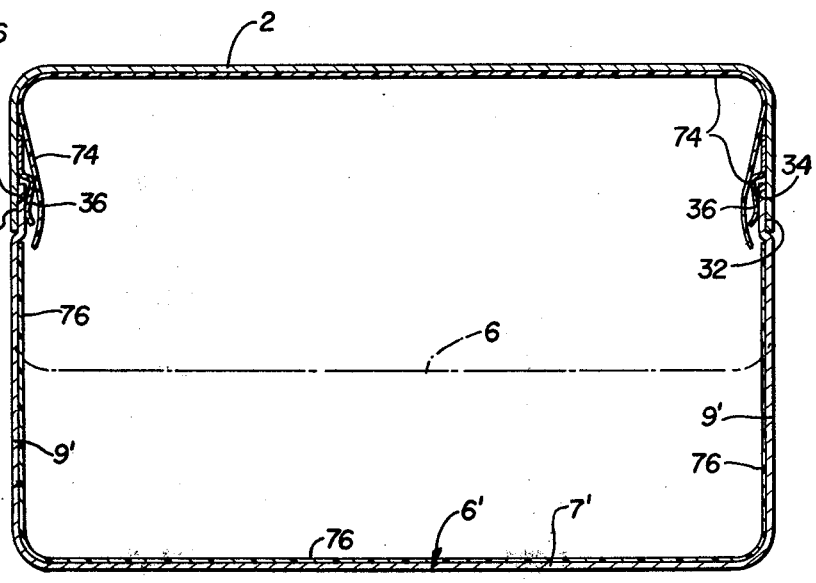
FIG. 3 is a horizontal sectional view of a terminal box which differs from the structure of FIGS. 1 and 2 only in the respect that the front channel has deeper side flanges to provide for an enlarged housing.

It is also desirable to provide a secure barrier to dust and moisture at the joint between the rear channel 2 and front channel 4. This is provided in part by the closely fitting overlapping vertical marginal portions on these channels as best shown in FIG. 3. The confronting surfaces 32 of the front channel 4 overlap and lie against corresponding confronting surfaces 34 of the vertical marginal portion of the rear channel member 2. This type of arrangement has been used in the past, but has not been altogether satisfactory as dust and moisture are still able to enter the housing. To avoid this, the invention herein proposes the inclusion of a resilient strip means 36 which has an outwardly flared free vertical edge portion. The resilient strip 36 is riveted to one of the channels, preferably by rivets 37 (FIG. 1) which connect it to the rear channel 2. This connection is made at a location adjacent to the confronting surfaces 32 and 34. The resilient strip is biased toward the surface 34 so that, prior to attachment of the front channel 4 to the rear channel 2, the spacing between strip 36 and surface 34 is less than the thickness of the vertical marginal portion of the front channel member. Therefore, when the vertical marginal portion of the front channel member is brought to the position between strip 36 and surface 34 as shown in FIG. 3, the resilient strip is sealingly biased against the marginal edge portion of the front channel member at a location on its surface which lies opposite to its confronting surface 32. In most instances, the resilient strip 36 will have a length which enables it to contact the entire vertical marginal portion of the upper front section 6.

Another point of entry for undesired moisture has been the bottom of the housing which is open to permit the entry of underground electrical conductors. This bottom opening has also provided a means of access for animals such as snakes and burrowing rodents. In order to exclude such animals from the housing, it has been customary to fill the bottom of the housing with pea gravel, but this arrangement does not provide a sufficient moisture barrier. These have been efforts to provide a moisture barrier by means of a screen which supports a continuous sheet of moldable material, but this prior arrangement has not been satisfactory inasmuch as the sheets of moldable material have tended to curl up and become ineffective in a relatively short period of time.

Figure 4:
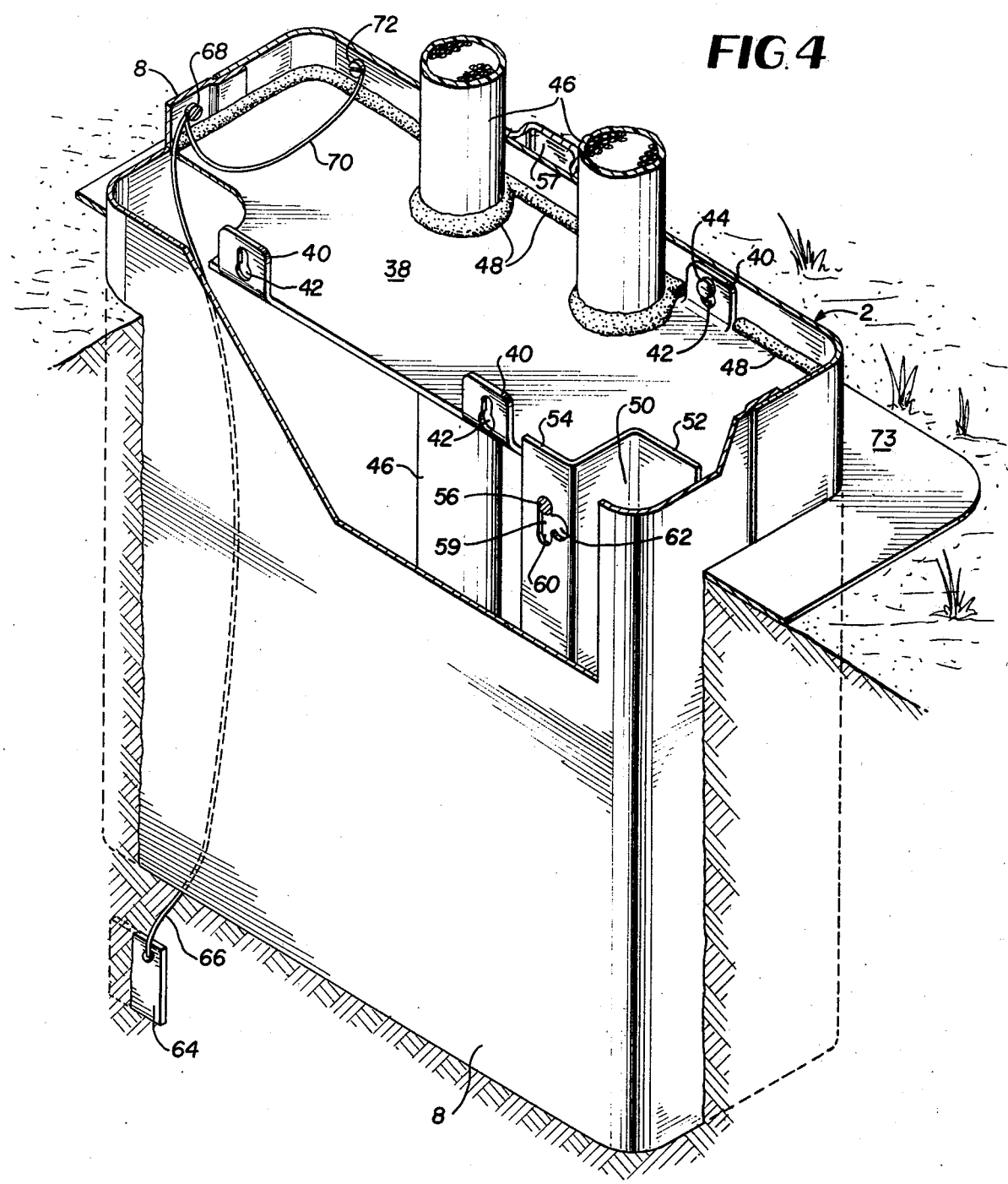
FIG. 4 is a broken perspective view of a lower part of a terminal box constructed according to the invention.

One feature of this invention is the presence of a continuous sheet which is supported directly on the housing and sealed against the housing to prevent the ingress of unwanted moisture and animals. This sheet 38 is shown in FIGS. 2 and 4. It extends transversely across the interior of the housing. The sheet is supported in the housing by integral upstanding tabs 40 provided with keyhole slots 42 which engage headed rivets 44 on the interior of the housing.

The sheet 38 is preferably formed of stainless steel having a thickness which permits it to be cut by ordinary tools such as scissors to form openings for the conductor cables 46. A thickness no greater than about 0.003 to 0.005 inch is suitable. After the cable-accommodating cutouts are made in the sheet 38, it is placed in position, the heads of rivets 44 are passed through the enlarged lower ends of keyhole slots 42, and the entire sheet 38 is moved downwardly until the tabs 40 are on the headed rivets 44. Then, a caulking sealant 48 is used to seal the sheet to the housing to prevent access by animals and moisture into the upper portion of the housing. Alternatively, the sealing means may be a specialized gasket around sheet 38, and the sheet 38 may be made of other scissor-cutable materials such as aluminum or non-moldable plastic sheeting.

It has been customary to provide the lower portions of terminal boxes with passages which guide conductors upwardly into the splicing area of the housing. These guide passages have been permanently connected to the interior of the housing, thus rendering them immovable so that they sometimes are in a location which is not convenient with respect to the location of incoming conductors. This problem is avoided by the terminal box of this invention in which the vertical passage 50 for guiding electrical conductors into the housing is formed by a movable angle member 52, which is spaced from the interior walls of the buried portion of the housing to form the passage 50.

The angle member 52 is provided with a mounting flange 54 which lies flat against an interior wall of the housing. The flange 54 is supported by a modified keyhole slot 59 on headed rivets 56 which are attached to the interior walls of the housing as seen in FIG. 1. The slot 59 includes a narrow elongated slot portion 60 which intersects a laterally-offset circular hole portion 62, the diameter of which is slightly greater than the diameter of the head of the supporting rivets 56. The passge-forming member is positioned by inserting the head of a rivet through the circular portion 62, shifting the mounting flange 54 laterally (to the right in FIG. 4, to the left in FIG. 1) and then moving the flange downwardly until the shank of each rivet 56 lies at the upper end of a slot 60. The lateral shifting motion causes the free edge of angle member 52 to move substantailly into contact with the side flange of the corresponding channel member.

The primary advantage of the mounting flange 54 is that it may be moved to different locations within the housing, these potential locations also being provided with headed fasteners such as the rivets 56. In FIG. 4, the passage 50 is in the forward right corner of the housing; and, in FIG. 1 it has been moved to the right rear corner of the housing where it is detachably supported by the additional rivet means 56.

The terminal box of this invention is preferably formed of steel. It is supported in part by a stake 57 attached to the center of the rear panel 10 as shown in FIG. 4. When such a metallic housing has a portion buried underground, corrosion may substantially shorten the useful life of the terminal box. One feature of the housing disclosed herein is a corrosion-prevention system uses the known principles of cathodic protection which have not been used heretofore in connection with terminal boxes for underground electric cables. The cathodic protection system is shown in FIG. 4 where it will be seen that a buried piece of metal 64 is electrically connected to a conductor 66, the opposite end of which is connected by screw 68 to the front channel member 8 of the housing. A jumper conductor 70 extends from screw 68 to screw 72 on the rear channel member to assure that the buried piece of metal 64 is connected both to the front and rear membrs of the housing. When a steel stake 57 is used to support the terminal box, it should be electrically connected to the buried anode. Such a connection may be made by bolting the stake to the rear panel of the housing, using an external tooth washer which will penetrate the paint or other coating on the housing to establish metal-to-metal contact.

According to the known principles of cathodic protection, the buried piece of metal 64 is anodic in the EMF series with respect to the metal of the housing. In the preferred embodiment, the housing is formed of steel and the buried piece 64 is a zinc plate. The corrosion which occurs in this system will be limited largely to the buried piece 64, little corrosion occuring to the housing so that its life will be substantially extended. While it is preferred to use a conductor such as 66 to provide an electrical connection between the buried plate 64, and the housing, it is possible to use as an electrical conductor the metallic jacket on a telephone cable 46. The buried plate may then be connected to the jacket or to a buried telephonic housing such as a splice case or a load coil housing.

As mentioned in the introductory portion of this specification, earlier terminal boxes have been vulnerable to damage by lawnmowers and grass fires due to the presence of grass which grows directly to the edge of the terminal box. It is proposed to avert such damage by surrounding the terminal box at grass level with a continuous sheet which extends peripherally about the terminal box to inhibit the growth of vegetation adjacent thereto. Such a sheet, greatly reduced in size for ease of illustration, is shown at 73 in FIG. 4. Preferably, it extends from the terminal box at least about 6 inches and is formed of a continuous piece of opaque material such as asphalt paper, linoleum, vinyl, outdoor carpet with polypropylene piles or other material which will prevent grass from growing therethrough. To improve its esthetic appearance, the sheet 73 may be of a green color to give an observer the general impression of grass.

The upper portion of the housing is generally referred to as the splicing area, since it is here that connections are made between the electrical conductors in the terminal box. When the terminal box is made of metal, it is known and desirable to provide an interiorly-located sheet of dielectric material in the splicing area. This prevents the electrical components from shorting against the interior walls of the terminal box and also deters arcing in the event of lightning. Dielectric sheets in terminal boxes have normally been of the single-piece wrap-around type, attached only to one part of the housing. Workers have found the sheets to be a nuisance, as they often interfere with their work. In order to avoid this nuisance which has led some service personnel to cut out the protective dielectric sheets, the terminal box disclosed herein is provided with two separate dielectric sheets, these being best shown in FIG. 3 where the rear sheet 74 of dielectric material is attached to the rear channel 2. This sheet 74 has its marginal edge portions extending beyond the edge of the resilient metallic strip 36. A corresponding front sheet 76 of dielectric material overlies and is connected to the interior face of the cover channel 6.

The sheets 74 and 76 have marginal vertical edge portions which overlie each other to provide electrical insulation throughout the horizontal extent of the housing as shown in FIG. 3, thus providing the desired safety without interfering with the access to the electrical components within the housing during installation or servicing of the electrical components.

There are occasions where the size of a terminal box renders it incapable of rendering further service in its specific location. This occurs when the electrical components within the terminal box become too large in size or number. Previously, this has required the entire replacement of a terminal box with a larger terminal box, made entirely of different components. The present terminal box, however, is more versatile, as it enables the conversion of a smaller terminal box into a larger terminal box which has the same rear channel 2. This concept is illustrated in FIG. 3 which, in solid lines, shows the enlarged terminal box wherein the front cover 6' has been substituted for the shallower front channel 6 illustrated in FIGS. 1 and 2. The replacement channel member 6' has a base 7' and side flanges 9', the side flanges 9' having vertical marginal portions which having a size and spacing substantially the same as those of the vertical margin portion of the front channel member 6. However, the side flanges 9' have a horizontal dimension greater than the corresponding side flange dimensions of the basic front channel member 6. Substitution of the enlarged replacement channel member 6' for the basic front channel member 6 will provide a terminal box with an enlarged interior volume for accommodating a larger number or size of electrical components.

The terminal box system with an enlarged replacement front channel is important from a manufacturing standpoint as it reduces the amount of tooling required to manufacture terminal boxes of different sizes. A single rear channel 2 having a two inch depth, requiring only one set of forming dies, may be used in connection with any of several front channels 4 having depths of four, six or eight inches. Previously it has been the practice to provide terminal boxes of different sizes, with both front and rear channels being of different size gradations. This required different dies for both the front and rear member of each size terminal box.

The method of using the enlarged replacement front channel is quite advantageous for telephone installation and repair crews. Previously, the enlargement of a terminal box has involved the time-consuming removal from the terminal box of all electrical components such as wires, grounding yokes, terminal blocks etc.; and, the re-mounting of these components on a replacement terminal box. These measures are rendered unnecessary by this invention which makes it possible to leave most of or all of the electrical components attached to the rear member, as only the front member of the terminal box is replaced. Of course, the terms "front" and "rear" are used herein for purposes of orientation without limitation, denoting respectively the housing member which is movable to permit access to the interior and the housing member which supports the enclosed electrical components.

The method of housing enlargement in the field is performed by removing channels 6 and 8 of the front member 4 and replacing these channels with corresponding parts such as 6' which have a greater depth. This replacement is done while leaving at least a major portion of the electrical components on the original rear member 2, thereby eliminating the time-consuming task of dismounting and remounting these components on a new rear member.

Figure 5:
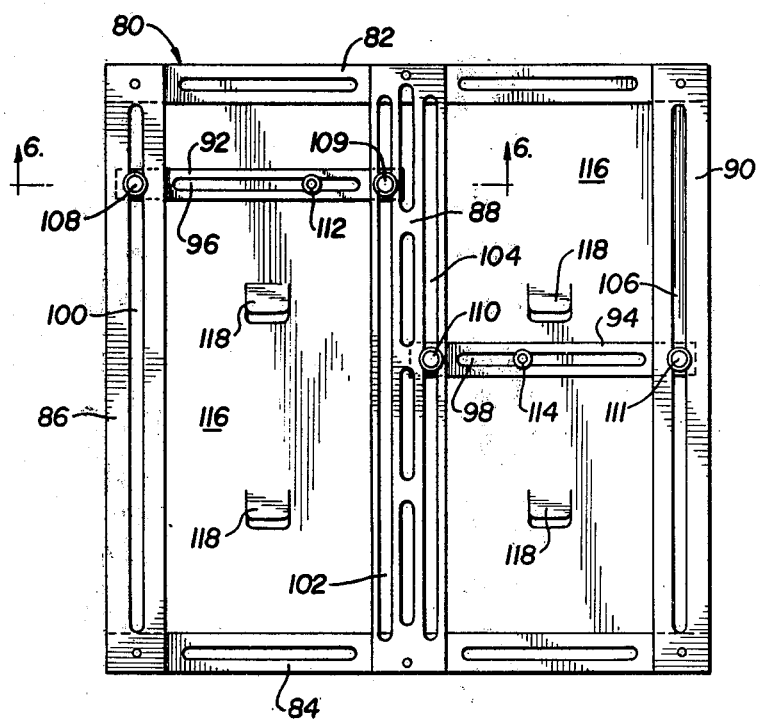
FIG. 5 is a front elevational view of a suitable means for supporting conductors and other electrical components in the housing.
Figure 6:
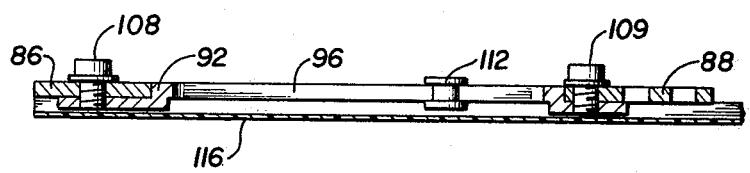
FIG. 6 is a sectional view thereof taken along the line 6—6 in FIG. 5.

Electrical components may be supported in the housing by various known means, but a preferred and novel arrangement is shown in FIGS. 5 and 6 which show a metal framework 80 which is mounted in the splicing area of the rear channel 2, i.e. the area covered by the rear dielectric sheet 74. The framework 80 may be stationary within the housing, but it preferably is movable from its normal operative position to a displaced position where access may be had to the space behind the framework 80. The framework 80 is formed of a top member 82 connected to a bottom member 84 by means of vertical members such as 86, 88, and 90. All of these members of framework 80 are provided with elongated holes. Vertically movable horizontal elements 92 and 94 are provided with horizontally elongated holes 96 and 98. These movable horizontal elements 92 and 94 are supported by fasteners which extend through the respective elongated holes 100, 102, 104 and 106 in the vertical elements of the metal framework 80. The elevation of the members 92 and 94 is adjusted by moving them vertically in the elongated slots 100, 102, 104 and 106 and then clamping them in a fixed position by tightening the machine screw fasteners 108, 109, 110 and 111. The position of an electrical component such as a cable or terminal block on one of the members 92 or 94 is also adjustable horizontally by moving a respective threaded socket 112 or 114 horizontally in the elongated holes 96 and 98. The sockets 112 and 114 may be constructed so that the tightening of a component-supporting screw in them will cause them to bear against the rear side of the corresponding member 92 or 94 to prevent further horizontal movement.

In addition to supporting electrical components such as cables or terminal blocks, the metallic framework 80 may be used to prevent access to conductors or other components positioned rearwardly thereof. Such access-prevention is the primary purpose of a plastic sheet 116 connected on the rear of frame 80. This sheet has U-shaped cuts providing movable flaps 118 which permit selected conductors to pass forwardly from the rear of the metal framework 80.

From the foregoing, it will be appreciated that the disclosed terminal box has many features of safety, durability, convenience and integrity which enable it to serve well in performing its intended functions. While only a preferred embodiment has been shown, those skilled in the art will realize that there are many variations thereof and modifications thereto which will provide corresponding advantages. Therefore, it is emphasized that the invention is not limited to the disclosed embodiment, but encompasses modifications thereto and variations thereof which fall within the spirit of the claims which follow.

I claim:

1. A terminal box for use in connection with underground electrical conductors, said terminal box comprising an upstanding housing having an upper exposed portion and a lower buried portion, said upper exposed portion being provided with an above-ground cover which is movable to provide access to the interior of said housing, means in said housing for supporting electrical conductors, an opening in said housing for the entry of underground electrical conductors, said upper portion of the housing including a cap with a top wall and depending peripheral sidewalls, opening means providing an air passage which leads upwardly under one of the sidewalls into the interior of said housing, and filter means positioned in said air passage to pass air but to deter the passage of dust, water, blowing snow and insects, said housing being formed of a front channel member and a rear channel member, said front channel member having a front panel and rearwardly extending side flanges, said rear channel member having a rear panel and forwardly extending side flanges, said side flanges of said channel members having vertical marginal portions, means for connecting the vertical marginal portions of said front channel member with vertical marginal portions of said rear channel member, said vertical marginal portions of said front channel member having a confronting surface which overlaps and lies against a corresponding confronting surface of the vertical marginal portions of said rear channel member, resilient strip means connected to one of said channel members at a location adjacent to a said confronting surface, said resilient strip means being sealingly biased against the opposed channel member at a location on its surface which lies opposite to its said confronting surface, a first sheet of dielectric material overlying and connected to the interior face of said front channel member, a second sheet of dielectric material overlying and connected to the interior face of said rear channel member, said sheets including marginal vertical edge portions which overlie each other to provide electrical insulation throughout the horizontal extent of the housing, a continuous barrier sheet extending transversely across the interior of the lower portion of said housing, and means sealing said sheet to the housing to prevent access by animals and ground moisture into the upper portion of the housing, said terminal box having passage-forming means in said lower portion providing a vertical passage for guiding the entrance of underground electrical conductors into the housing, said passage-forming means including a first portion for lying against an interior wall of said housing, and a second portion which is spaced from the interior walls of the buried portion of the housing to form said passage, means for detachably connecting the first portion of the passage-forming means to the lower portion of the housing, and additional means in the housing for detachably connecting the passage-forming means at different locations within the lower portion, said lower portion of the housing being formed of a first metal, a buried piece formed of a second metal which is anodic in the EMF series with respect to the first metal, and electrical conductor means in electrical conducting relationship with both the lower portion and the piece formed of a second metal to minimize corrosion of said lower portion.

2. A terminal box for use in connection with underground electrical conductors, said terminal box comprising an upstanding housing having an upper exposed portion and a lower buried portion, said upper exposed portion being provided with an above-ground cover which is movable to provide access to the interior of said housing, means in said housing for supporting electrical conductors, an opening in said housing for the entry of underground electrical conductors, said terminal box having passage-forming means in said lower portion providing a vertical passage for guiding the entrance of underground electrical conductors into the housing, said passage-forming means including a first portion for lying against an interior wall of said housing, and a second portion which is spaced from the interior walls of the buried portion of the housing to form said passage, means for detachably connecting the first portion of the passage-forming means to the lower portion of the housing, and additional means in the housing for detachably connecting the passage-forming means at different locations within the lower portion.

3. The terminal box of claim 2 wherein said means for connecting the passage forming means to the lower portion of the housing includes a headed fastener on the housing and an aperture in said first portion of the passage-forming means, said aperture having a vertically elongated slot portion and an enlarged portion which is spaced from the ends of said vertically elongated slot portion.

4. A terminal box for use in connection with underground electrical conductors, said terminal box comprising an upstanding housing having an upper exposed portion and a lower buried portion, said upper exposed portion being provided with an above-ground cover which is movable to provide access to the interior of said housing, means in said housing for supporting electrical conductors, an opening in said housing for the entry of underground electrical conductors, said housing being formed of a front channel member and a rear channel member, said front channel member having a front panel and rearwardly extending side flanges, said rear channel member having a rear panel and forwardly extending side flanges, said side flanges of said channel members having vertical marginal portions, means for connecting the vertical marginal portions of said front channel member with vertical marginal portions of said rear channel member, a first sheet of dielectric material overlying and connected to the interior face of said front channel member, a second sheet of dielectric material overlying and connected to the interior face of said rear channel members, said sheets including marginal vertical edge portions which overlie each other to provide electrical insulation throughout the horizontal extent of the housing.

5. A terminal box for use in connection with underground electrical conductors, said terminal box comprising an upstanding housing having an upper exposed portion and a lower buried portion, said upper exposed portion being provided with an above-ground cover which is movable to provide access to the interior of said housing, means in said housing for supporting electrical conductors, an opening in said housing for the entry of underground electrical conductors, said housing being formed of a front channel member and a rear channel member, said front channel member having a front panel and rearwardly extending side flanges, said rear channel member having a rear panel and forwardly extending side flanges, said side flanges of said channel members having vertical marginal portions, means for connecting the vertical marginal portions of said front channel member with vertical marginal portions of said rear channel member to hold the channel members at a predetermined position with respect to each other, said vertical marginal portions of said front channel member having a confronting surface which overlaps and lies against a corresponding confronting surface of the vertical marginal portions of said rear channel member, resilient strip means connected to one of said channel members at a location adjacent to a said confronting surface, said resilient strip means being sealingly biased against the opposed channel member at a location on its surface which lies opposite to its said confronting surface, said resilient strip means contacting the opposed channel member in an area spaced from the edge of the opposed channel member when said channel members are at a said predetermined position with respect to each other, said resilient strip means having a lip portion outturned from the confronting surface of its respective channel member.

6. The terminal box of claim 5, said upper portion of the housing including a cap with a top wall and depending peripheral sidewalls, opening means providing an air passage which leads upwardly under one of the sidewalls into the interior of said housing, and filter means positioned in said air passage to pass air but to deter the passage of dust, water, blowing snow and insects.

7. The terminal box of claim 5 having a first sheet of dielectric material overlying and connected to the interior face of said front channel member, a second sheet of dielectric material overlying and connected to the interior face of said rear channel member, said sheets including marginal vertical edge portions which overlie each other to provide electrical insulation throughout the horizontal extent of the housing.

8. The terminal box of claim 7, said upper portion of the housing including a cap with a top wall and depending peripheral sidewalls, opening means providing an air passage which leads upwardly under one of the sidewalls into the interior of said housing, and filter means positioned in said air passage to pass air but to deter the passage of dust, water, blowing snow and insects.

9. A terminal box for use in connection with underground electrical conductors, said terminal box comprising an upstanding housing having an upper exposed portion and a lower buried portion, said upper exposed portion being provided with an above-ground cover which is movable to provide access to the interior of said housing, means in said housing for supporting electrical conductors, an opening in said housing for the entry of underground electrical conductors, said lower portion of the housing being formed of steel, a buried piece formed of zinc which is anodic in the EMF series with respect to steel, and electrical conductor means in electrical conducting relationship with both the lower portion and the piece formed of zinc to minimize corrosion of said lower portion, said terminal box having passage-forming means in said lower portion providing a vertical passage for guiding the entrance of underground electrical conductors into the housing, said passage-forming means including a first portion for lying against an interior wall of said housing, and a second portion which is spaced from the interior walls of the buried portion of the housing to form said passage, means for detachably connecting the first portion of the passage-forming means to the lower portion of the housing, and additional means in the housing for detachably connecting the passage-forming means at different locations within the lower portion.

* * * * *